(12) United States Patent
Goodman

(10) Patent No.: US 10,773,694 B2
(45) Date of Patent: Sep. 15, 2020

(54) ANTI-THEFT ELECTRONIC PARKING BRAKE ACTUATOR

(71) Applicant: Larry Goodman, Cerritos, CA (US)

(72) Inventor: Larry Goodman, Cerritos, CA (US)

(73) Assignee: KTAG GROUP, INC., Long Beach, CA (US)

(\*) Notice: Subject to any disclaimer, the term of this patent is extended or adjusted under 35 U.S.C. 154(b) by 44 days.

(21) Appl. No.: 16/000,032

(22) Filed: Jun. 5, 2018

(65) Prior Publication Data

US 2019/0366988 A1    Dec. 5, 2019

(51) Int. Cl.
*B60T 7/16* (2006.01)
*B60R 25/102* (2013.01)
*B60R 25/10* (2013.01)

(52) U.S. Cl.
CPC ............ *B60T 7/16* (2013.01); *B60R 25/1001* (2013.01); *B60R 25/102* (2013.01); *B60T 2250/04* (2013.01)

(58) Field of Classification Search
CPC ............ B60T 7/16; B60T 13/66; F16D 65/28
USPC ...... 188/156–164, 1.11 E, 2 D; 303/3, 7, 15, 303/20, 89, 191, 122.05; 701/36, 70–72, 701/83
See application file for complete search history.

(56) References Cited

U.S. PATENT DOCUMENTS

| | | | |
|---|---|---|---|
| 3,830,330 A * | 8/1974 | Fontaine | B60T 7/12 180/273 |
| 5,180,038 A | 1/1993 | Arnold et al. | |
| 5,413,197 A | 5/1995 | Baer et al. | |
| 5,793,007 A | 8/1998 | Matsumoto | |
| 6,037,673 A * | 3/2000 | Buhler | B60Q 1/44 307/10.8 |
| 6,213,259 B1 | 4/2001 | Hanson et al. | |
| 6,406,102 B1 | 6/2002 | Arnold | |
| 6,685,281 B2 * | 2/2004 | MacGregor | B60T 7/10 303/123 |
| 6,702,405 B1 | 3/2004 | Balz et al. | |
| 7,231,994 B2 | 6/2007 | Buglione et al. | |
| 7,448,699 B2 * | 11/2008 | Manaka | B60T 7/122 188/71.9 |
| 8,370,039 B2 * | 2/2013 | Bentner | B60T 7/107 701/36 |
| D677,624 S | 3/2013 | Goodman | |
| 8,739,944 B1 * | 6/2014 | Goodman | F16D 65/28 188/156 |
| 2007/0029876 A1 | 2/2007 | Makishima et al. | |
| 2009/0247364 A1 | 10/2009 | Sano et al. | |
| 2009/0314590 A1 | 12/2009 | Dagh et al. | |
| 2010/0211281 A1 * | 8/2010 | Baier-Welt | B60T 7/12 701/70 |
| 2014/0067221 A1 * | 3/2014 | Sundaram | B60T 7/042 701/70 |

(Continued)

*Primary Examiner* — Christopher P Schwartz
(74) *Attorney, Agent, or Firm* — Kenneth L. Green; Averill & Green

(57) ABSTRACT

An anti-theft electronic parking brake actuator includes a key switch for activating and de-activating the parking brake, and preventing theft of a vehicle. The electronic parking brake actuator further includes a cell phone interface to both notify an owner when the parking brake is released. The electronic parking brake actuator may further include a GPS device monitoring vehicle location and notifying the owner if the vehicle is moved while the parking brake is actuated, and reporting vehicle location.

12 Claims, 3 Drawing Sheets

(56) References Cited

U.S. PATENT DOCUMENTS

2018/0339707 A1* 11/2018 Schartner ......... B60W 30/18118
2019/0344750 A1* 11/2019 Takata ................. G05D 1/0212

* cited by examiner

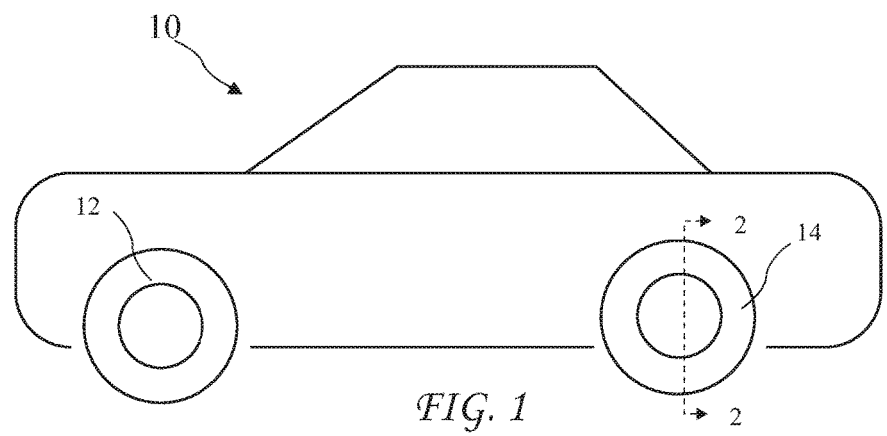
FIG. 1
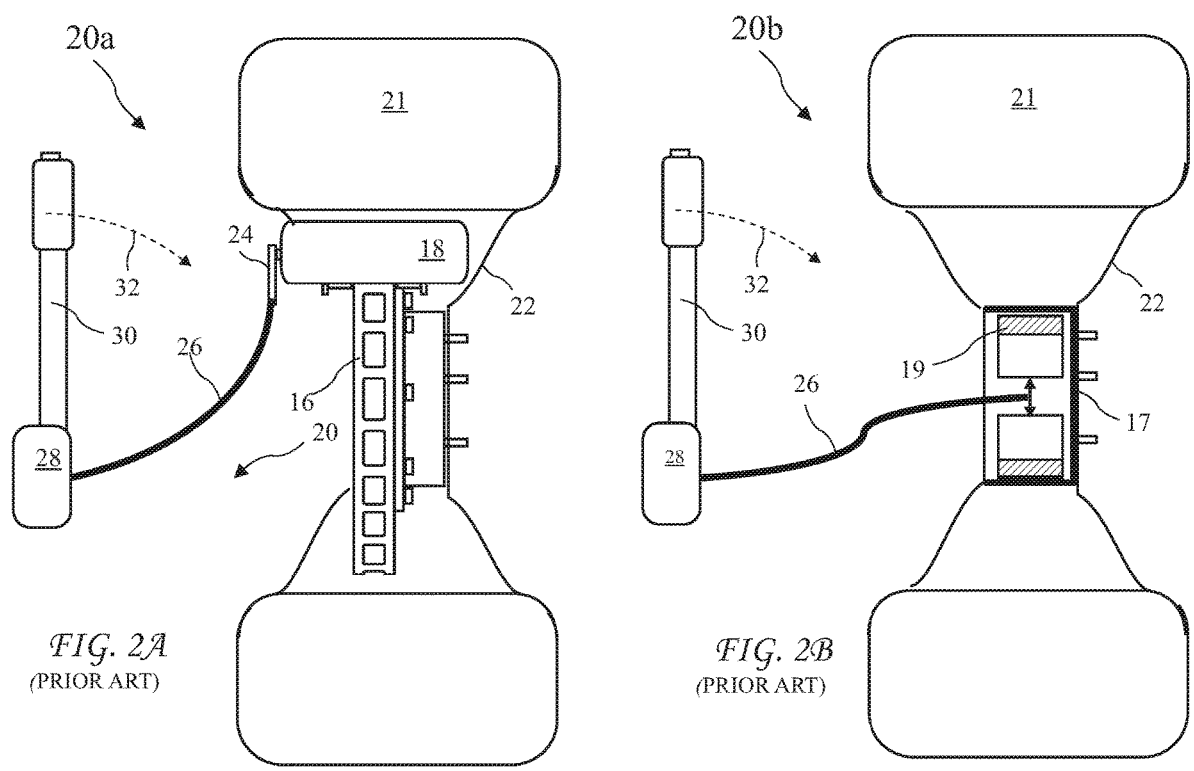
FIG. 2A
(PRIOR ART)
FIG. 2B
(PRIOR ART)

ANTI-THEFT ELECTRONIC PARKING BRAKE ACTUATOR

BACKGROUND OF THE INVENTION

The present invention relates to vehicle parking brakes and in particular to an electronic parking brake actuator with anti-theft features.

Automobile theft has become a more common problem in recent years. Unfortunately, customized vehicles have become targets and often the added features are difficult or impossible to replace. Owners of these vehicles often utilize an after market electronic parking brake actuator. Known electronic parking brake actuators are often activated by a simple push button switch. Such switches do not provide any anti-theft features.

Further, vehicle thefts are often performed by dragging the vehicle onto a flat bed car hauler. Unfortunately, locking the vehicle brakes does prevent such thefts.

BRIEF SUMMARY OF THE INVENTION

The present invention addresses the above and other needs by providing an anti-theft electronic parking brake actuator which includes a key switch for activating and de-activating the parking brake, and preventing theft of a vehicle. The electronic parking brake actuator further includes a cell phone interface to both notify an owner when the parking brake is released. The electronic parking brake actuator may further include a GPS device monitoring vehicle location and transmitting a wireless signal notifying an owner if the vehicle is moved while the parking brake is actuated, and reporting vehicle location.

In accordance with one aspect of the invention, there is provided an intelligent anti theft system having a key switch actuator. In case of theft, the key switch prevents de-activation of the parking brakes, preventing or hindering movement of the vehicle.

In accordance with another aspect of the invention, there is provided an intelligent anti theft system having a key switch actuator and a wireless remote control. In instances where a vehicle owner desires to allow another driver to move the vehicle, the parking brake may be released remotely without requiring use of the key switch. The wireless remote may further be a cell phone allowing deactivation from any location where cell phone reception is available.

In accordance with yet another aspect of the invention, there is provided an intelligent anti theft system combining features of the electronic parking brake actuator with a Global Positioning Satellite (GPS) module. The GPS module is active whenever the electronic parking brake actuator is ON. If the GPS module is active and detects movement of the vehicle, an alert is provided to a wireless remote control, or to the owner's cell phone. The detection of vehicle movement when the parking brake is actuated defeats the common practice of vehicle theft using a flat bed truck.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows a vehicle having a parking brake.

FIG. 2A shows a prior art manually actuated parking brake system.

FIG. 2B shows a second prior art manually actuated parking brake system.

Corresponding reference characters indicate corresponding components throughout the several views of the drawings.

DETAILED DESCRIPTION OF THE INVENTION

Figure 3:
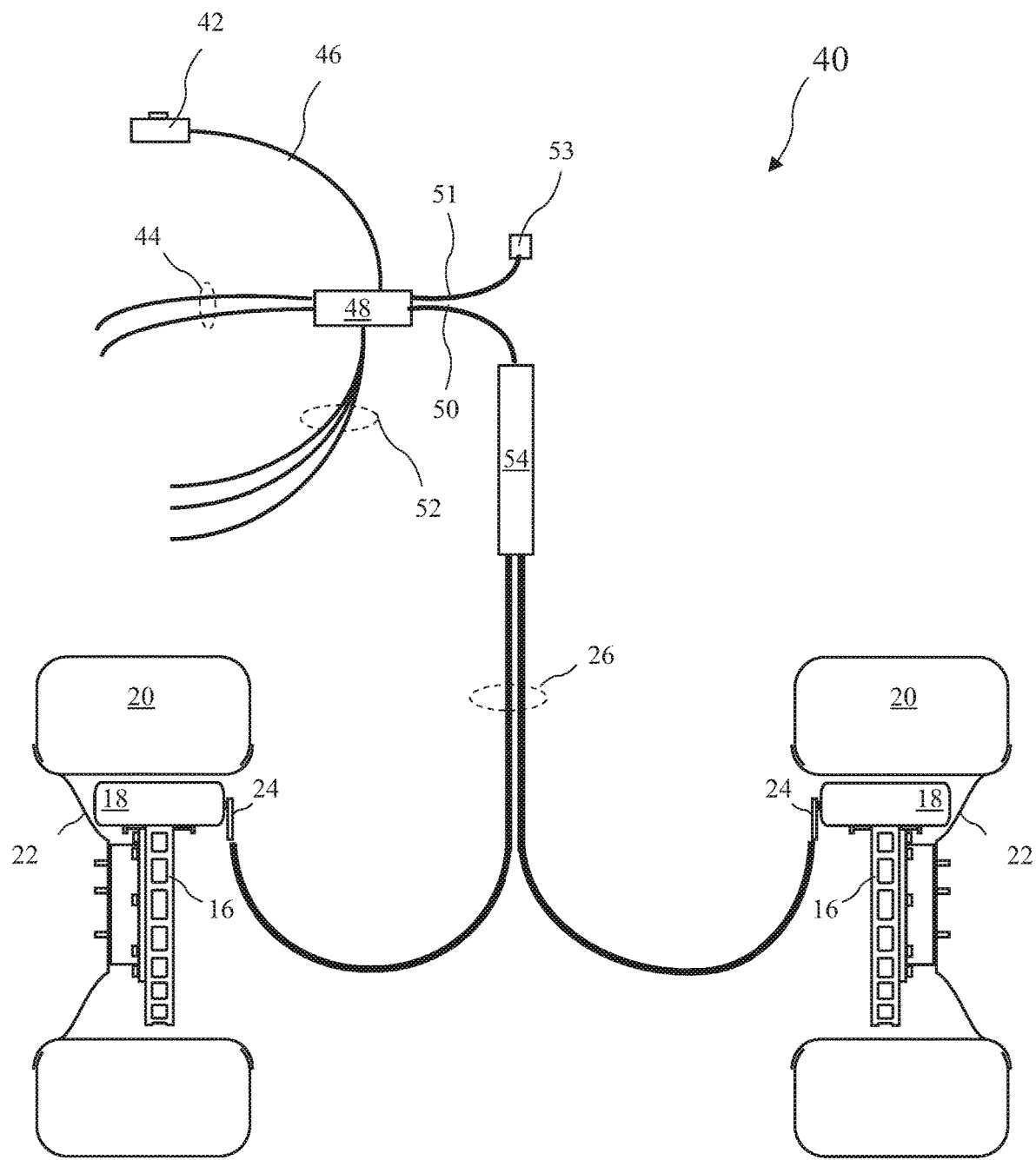
FIG. 3 shows an electrically actuated parking brake system according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

A vehicle 10 having a parking brake for resisting rotation of the front wheels 12 or rear wheels 14 is shown in FIG. 1.

A first prior art manually actuated parking brake system 20a is shown in FIG. 2A. The manually actuated parking brake system 20a includes a lever 30 which may be pulled along an arc 32 to pull a cable 26 connected to a lever 24 on a caliper 18. When operated, the caliper 18 squeezes brake pads against a rotor 16 fixed to rotate with a wheel 22 carrying a tire 21. When actuated, the manually actuated parking brake system 20 causes resistance to rotation of the wheel 22 and tire 21, thereby resisting rolling of the vehicle 10. In some instances the lever 30 is replaced by a foot pedal and the caliper 18 and rotor 16 are replaced by a drum brake. In any of these known manually actuated parking brake systems 20a, effort is required to actuate the parking brake which may be difficult or impossible for a disabled driver.

A second prior art manually actuated parking brake system 20b is shown in FIG. 2B. The manually actuated parking brake system 20b includes brake pads 19 pressed against an inner wall of a brake drum 17 which causes resistance to rotation of the wheel 22 and tire 21. Just as with the manually actuated parking brake system 20a, the manually actuated parking brake system 20b requires effort to actuate the parking brake which may be difficult or impossible for a disabled driver.

An electrically actuated parking brake system 40 according to the present invention is shown in FIG. 3. The electrically actuated parking brake system 40 includes a switch 42 for mounting in the vehicle 10 cabin. The switch 42 may be a key switch requiring a key to change the switch from ON to OFF or from OFF to ON. The switch 42 is electrically connected to an intelligent controller 48 through wires 46 to provide an ON/OFF signal to the intelligent controller 48. The intelligent controller 48 receives power through wires 44 and also may receive electrical signals through wires 52 from one or more vehicle devices. The intelligent controller 48 is electrically connected to a linear actuator 54 through wires 50. When the switch 42 is ON, and the signals from the vehicle devices are consistent with the vehicle operator applying the parking brake, the intelligent controller 48 sends a signal to the linear actuator 54. When the linear actuator 54 receives the signal from the intelligent controller 48, the linear actuator 54 mechanically draws the cable 26 thereby applying the parking brake(s).

An indicator 53 is connected to the intelligent controller 48 by wires 51. The indicator 53 provides a visual or audible indication that the electrically actuated parking brake system 40 has been turned ON or OFF, and when the electrically actuated parking brake system 40 completes the transition from OFF to ON or from ON to OFF. For example, the indicator 53 may be a light and the light blinks during the transition from OFF to ON or from ON to OFF. In one embodiment, the light blinks during the transition from OFF to ON and is a solid when the electrically actuated parking brake system 40 is ON, and the light blinks during the transition from ON to OFF and is a solid when the electrically actuated parking brake system 40 is OFF. The light may be a single color, or may be two colors, for example, may be red during actuation and green during deactivation.

The intelligent controller 48 may be integrated into a switch housing of the switch 42 and need not be a separate device. The signals received from vehicle devices may be: vehicle speed, a throttle position (gas pedal) signal, an engine on signal, a transmission not in park signal, an accessories on signal, or one or more electrical signal from any electrical device of the vehicle 10. For example, the parking brake may be inhibited when the vehicle speed is not zero.

Further, in some instances such as parking on a slope, the parking brakes alone may not hold the vehicle. The intelligent controller 48 may continue to monitor vehicle speed after turning ON. If a non-zero vehicle speed is sensed, an alarm may be issued to warn that the vehicle is moving. The alarm may be a visual alarm or an audio alarm or both. For example, a vehicle horn may be sounded. Additionally, intelligent controller 48 may send an electronic signal to a wireless monitor if the vehicle speed is not zero after the parking brake is fully actuated.

Figure 4:
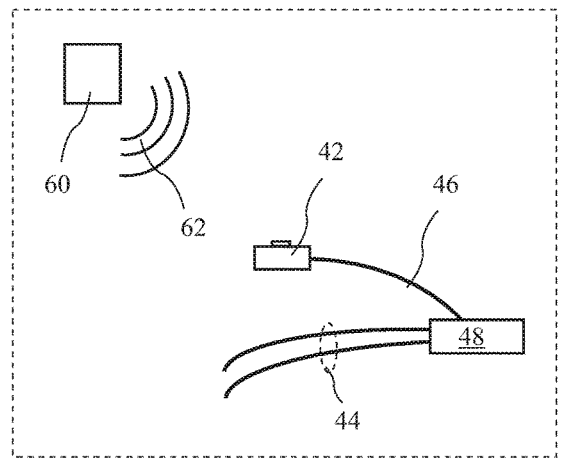
FIG. 4 shows an electrically actuated parking brake system having a remote control according to the present invention.

An electrically actuated parking brake system 40 having a wireless remote control 60 according to the present invention is shown in FIG. 4. The remote control 60 provides a parking brake on signal allowing an individual physically moving a vehicle, for example on a sloped surface, to actuate and de-actuate the parking brake without entering the vehicle. The intelligent controller 48 preferably includes a remote control lockout to prevent a random signal for actuating the parking brake(s). The remote control 60 may be a dedicated device or be a cell phone. Further, the wireless remote 60 or 74 may override the key switch 42, allowing a vehicle owner to remotely de-activate the parking brake allowing the vehicle to be moved without switching the key switch from ON to OFF.

Figure 5:
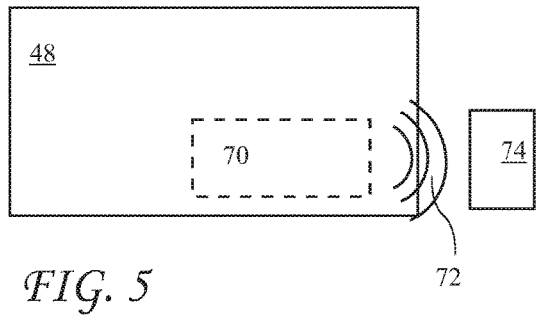
FIG. 5. shows a controller according to the present invention including a GPS module.

A controller 48 including a Global Positioning Satellite (GPS) module 70 is shown in FIG. 5. The GPS module 70 receives a GPS signal and monitors the location of the vehicle 10. If the GPS module 70 observes that the vehicle 10 has moved while the electrically actuated parking brake system 40 is active, the GPS module may sound an alarm, and may send a signal 72 to either the wireless remote control 60, or to a cell phone 74, to alert an owner of a possible theft, and may provide vehicle location.

Figure 6:
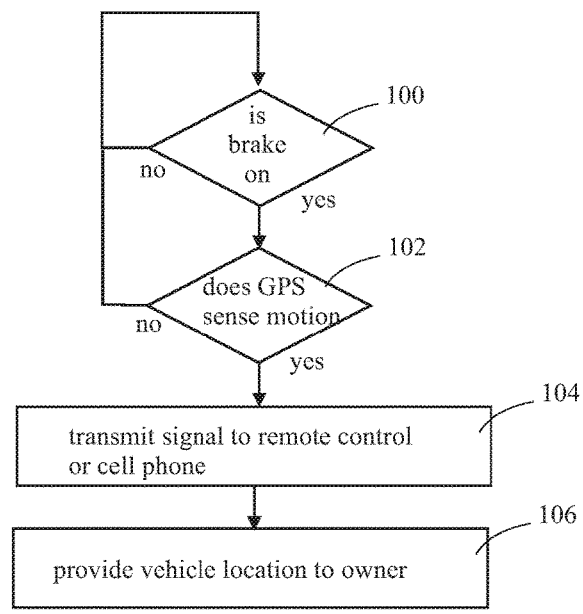
FIG. 6 shows a method according to the present invention.

A method for preventing vehicle theft is described in FIG. 6. The controller 48 determines if the electrically actuated parking brake system 40 is active at step 100. If the electrically actuated parking brake system 40 is active, the GPS module monitors a position of the vehicle 10 at step 102, and if the position changes while the electrically actuated parking brake system 40 is active, the GPS module transmits a signal to a remote device, for example the wireless remote 60 or to the cell phone 70, alerting the owner that the vehicle is being stolen at step 104. If the remote device includes a display, vehicle location is provided at step 106.

While the invention herein disclosed has been described by means of specific embodiments and applications thereof, numerous modifications and variations could be made thereto by those skilled in the art without departing from the scope of the invention set forth in the claims.

I claim:

1. An electronic parking brake actuator comprising:
    a linear actuator mechanically connected to mechanical parking brakes;
    a controller electronically connected to the linear actuator and providing a control signal to the linear actuator;
    a key switch electronically connected to the controller, the key switch requiring a key to change the switch from an ON position and an OFF position, the mechanical parking brakes activated in the ON position and de-activated in the OFF position; and
    a wireless remote control, wherein the parking brake may be released remotely by the remote control without switching the key switch from ON to OFF,
    wherein:
        the controller includes a Global Positioning Satellite (GPS) module sensing vehicle position and providing an alarm if the vehicle is moved while the electronic parking brake is ON; and
        the GPS module sensing vehicle position and wirelessly transmits the alarm to the remote control if the vehicle is moved while the electronic parking brake is ON.

2. The electronic parking brake actuator of claim 1, further including a wireless remote control, wherein the parking brake may be released remotely by the wireless remote control without switching the key switch from ON to OFF.

3. The electronic parking brake actuator of claim 2, further wherein the wireless remote control is a cell phone.

4. The electronic parking brake actuator of claim 1, wherein the GPS module sensing vehicle position and provides vehicle location to the remote control if the vehicle is moved while the electronic parking brake is ON.

5. The electronic parking brake actuator of claim 1, wherein the GPS module senses the vehicle position and wirelessly transmits the alarm to the remote control if the vehicle is moved while the electronic parking brake is ON without front wheels or rear wheels turning.

6. The electronic parking brake actuator of claim 1, wherein the GPS module senses the vehicle position and wirelessly transmits the alarm to the remote control if the vehicle is dragged onto a car hauler while the electronic parking brake is ON.

7. An electronic parking brake actuator comprising:
    a linear actuator mechanically connected to mechanical parking brakes;
    a controller electronically connected to the linear actuator and providing a control signal to the linear actuator;
    a key switch requiring a key, the key switch electronically connected to the controller, the key switch having an ON position and an OFF position, the mechanical parking brakes activated in the ON position and de-activated in the OFF position; and
    a Global Positioning Satellite (GPS) module sensing vehicle position and transmitting a wireless alarm to a vehicle owner if the vehicle is moved while the electronic parking brake is ON.

8. The electronic parking brake actuator of claim 7, wherein the GPS module senses the vehicle position and transmitting a wireless alarm to the vehicle owner if the vehicle is moved while the electronic parking brake is ON without front wheels or rear wheels turning.

9. The electronic parking brake actuator of claim 7, wherein the GPS module senses the vehicle position and transmitting a wireless alarm to the vehicle owner if the vehicle is dragged onto a car hauler while the electronic parking brake is ON.

10. An electronic parking brake actuator comprising:
 a linear actuator mechanically connected to mechanical parking brakes;
 a controller electronically connected to the linear actuator and providing a control signal to the linear actuator;
 a key switch requiring a key electronically connected to the controller, the key switch requiring a key to change the switch from an ON position and an OFF position, the mechanical parking brakes activated in the ON position and de-activated in the OFF position;
 a wireless remote control, wherein the parking brake may be released remotely by the wireless remote control without switching the key switch from ON to OFF; and
 a Global Positioning Satellite (GPS) module sensing vehicle position and wirelessly transmitting an alarm and vehicle position to the wireless remote control if the vehicle is moved while the electronic parking brake is ON.

11. The electronic parking brake actuator of claim 10, wherein the GPS module senses the vehicle position and wirelessly transmits the alarm to the remote control if the vehicle is moved while the electronic parking brake is ON without front wheels or rear wheels turning.

12. The electronic parking brake actuator of claim 10, wherein the GPS module senses the vehicle position and wirelessly transmits the alarm to the remote control if the vehicle is dragged onto a car hauler while the electronic parking brake is ON.

\* \* \* \* \*